Figure 16:
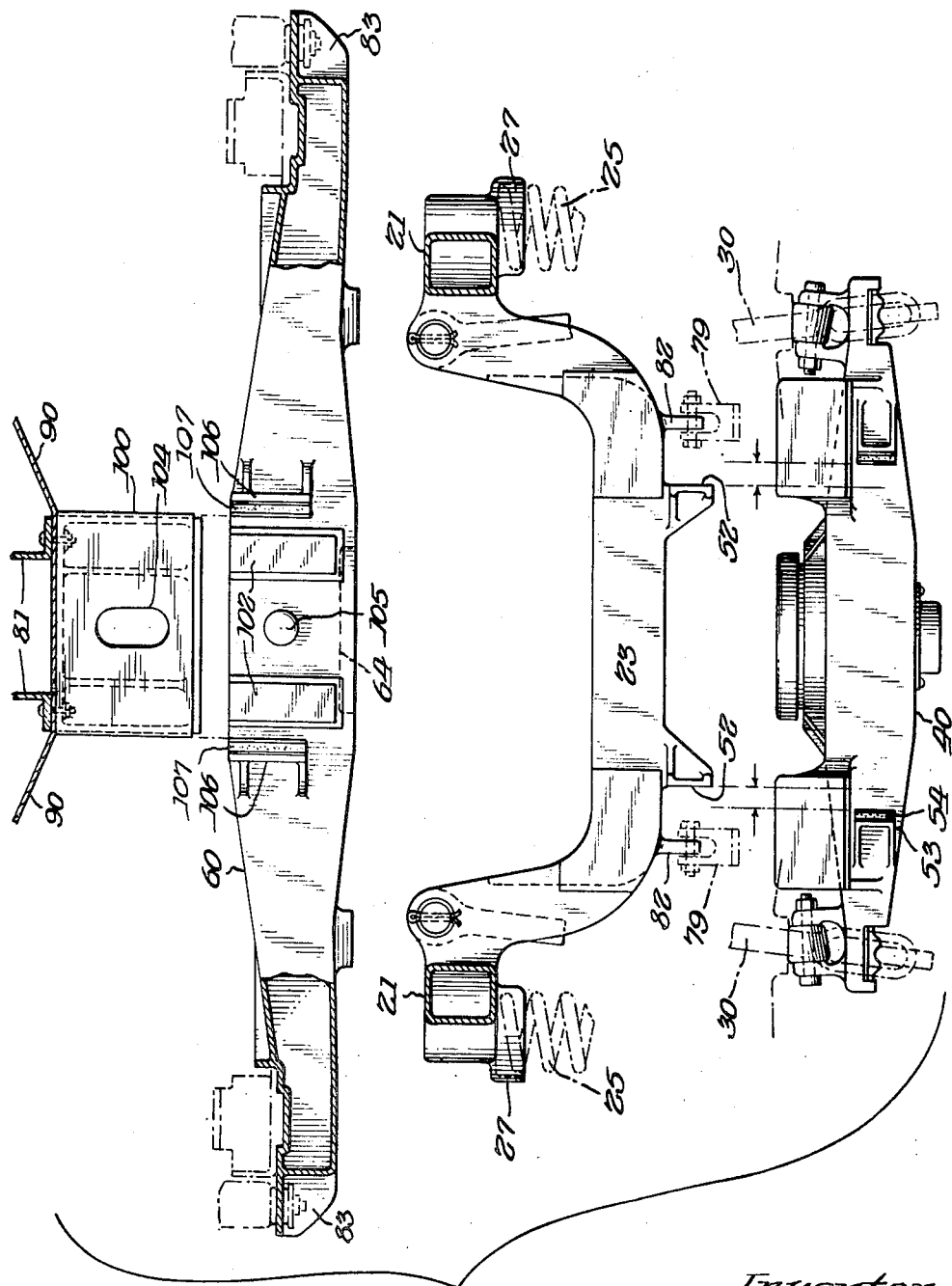

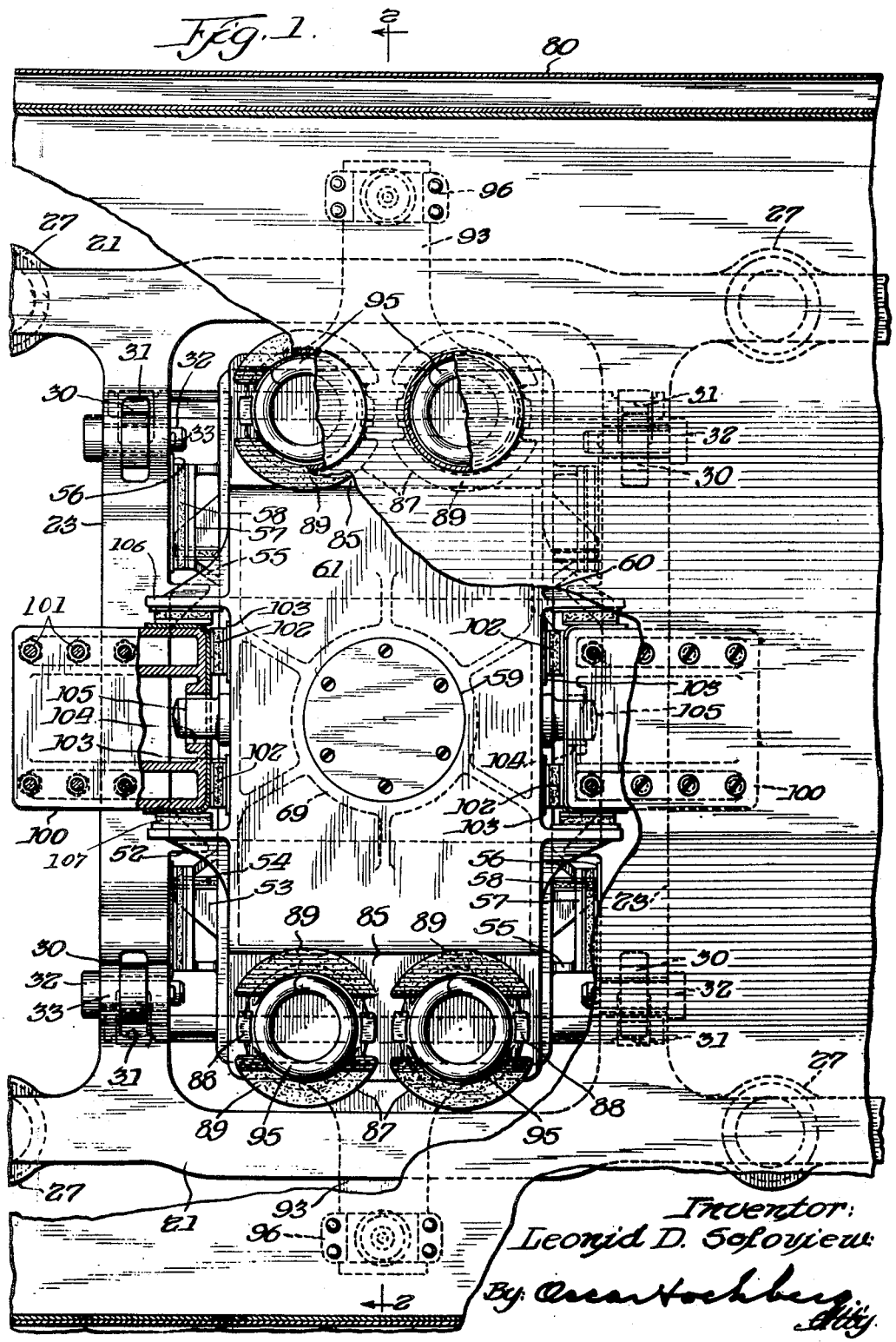

March 14, 1950

L. D. SOLOVIEW 2,500,906

RAILWAY CAR TRUCK

Filed Oct. 28, 1944

8 Sheets-Sheet 2

Inventor:
Leonid D. Soloview
By: Oscar Hochberg
Atty.

March 14, 1950
L. D. SOLOVIEW
2,500,906
RAILWAY CAR TRUCK
Filed Oct. 28, 1944
8 Sheets-Sheet 3
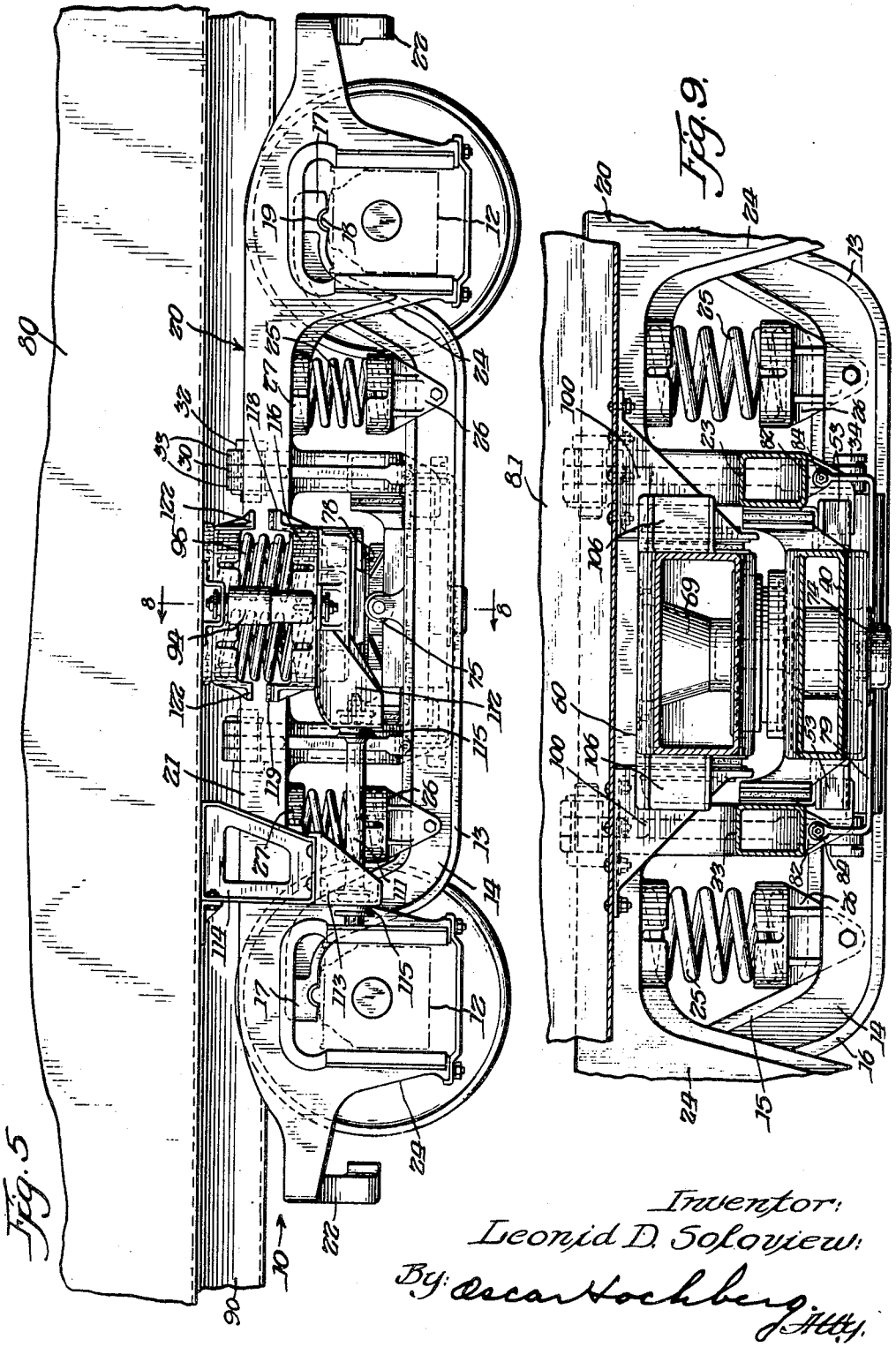
Inventor:
Leonid D. Soloview,
By: Oscar Hochberg
Atty.

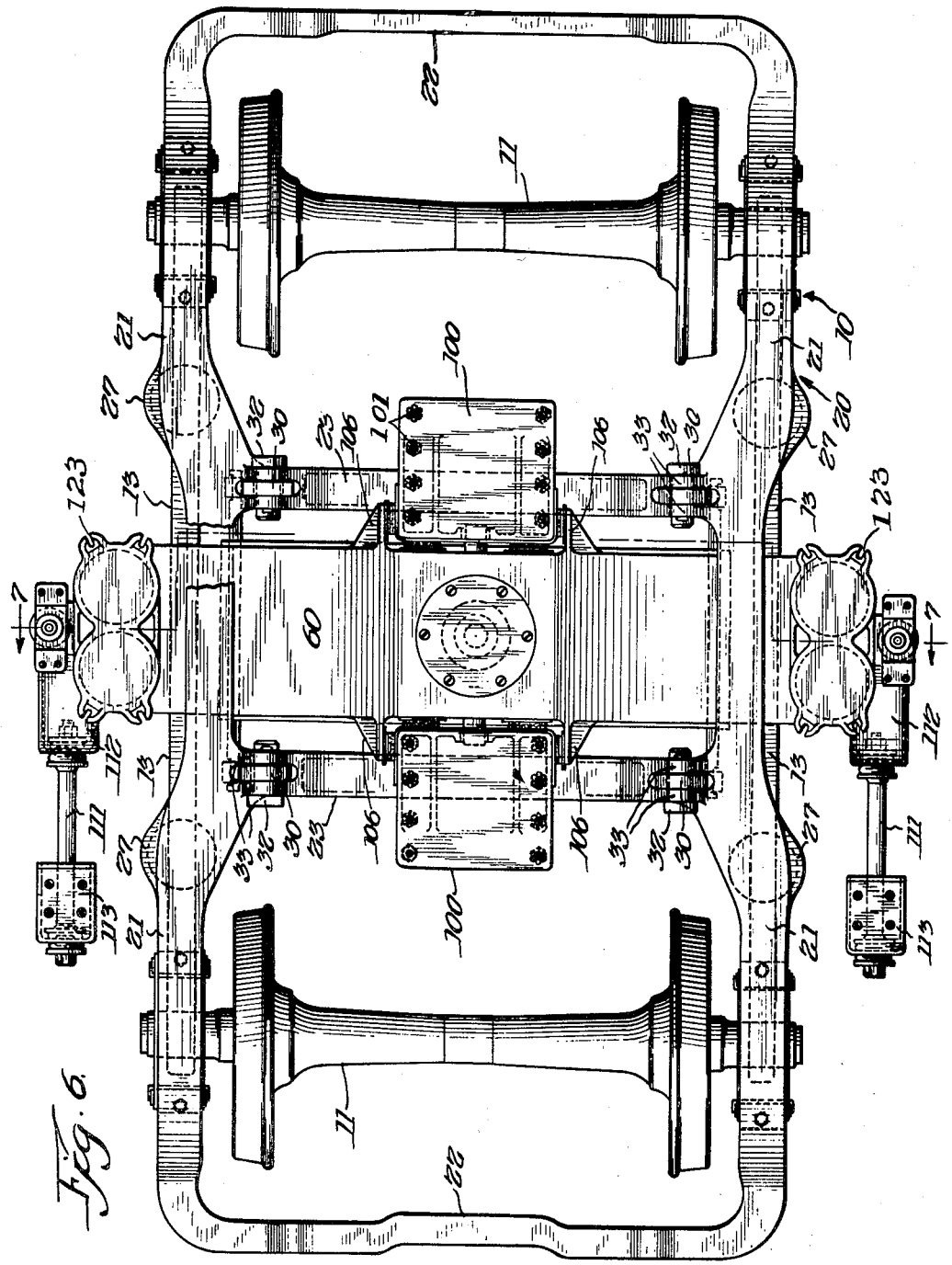

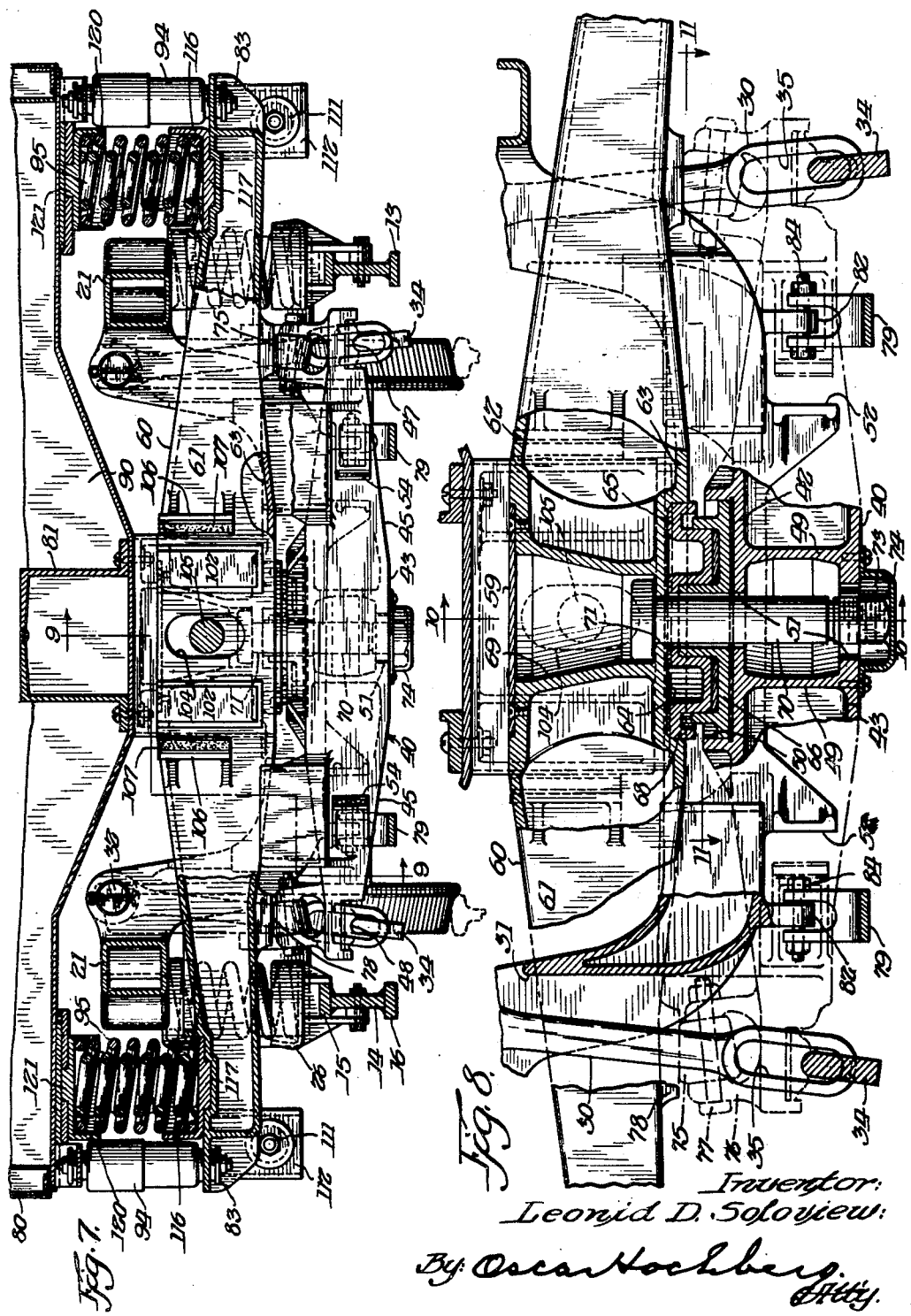

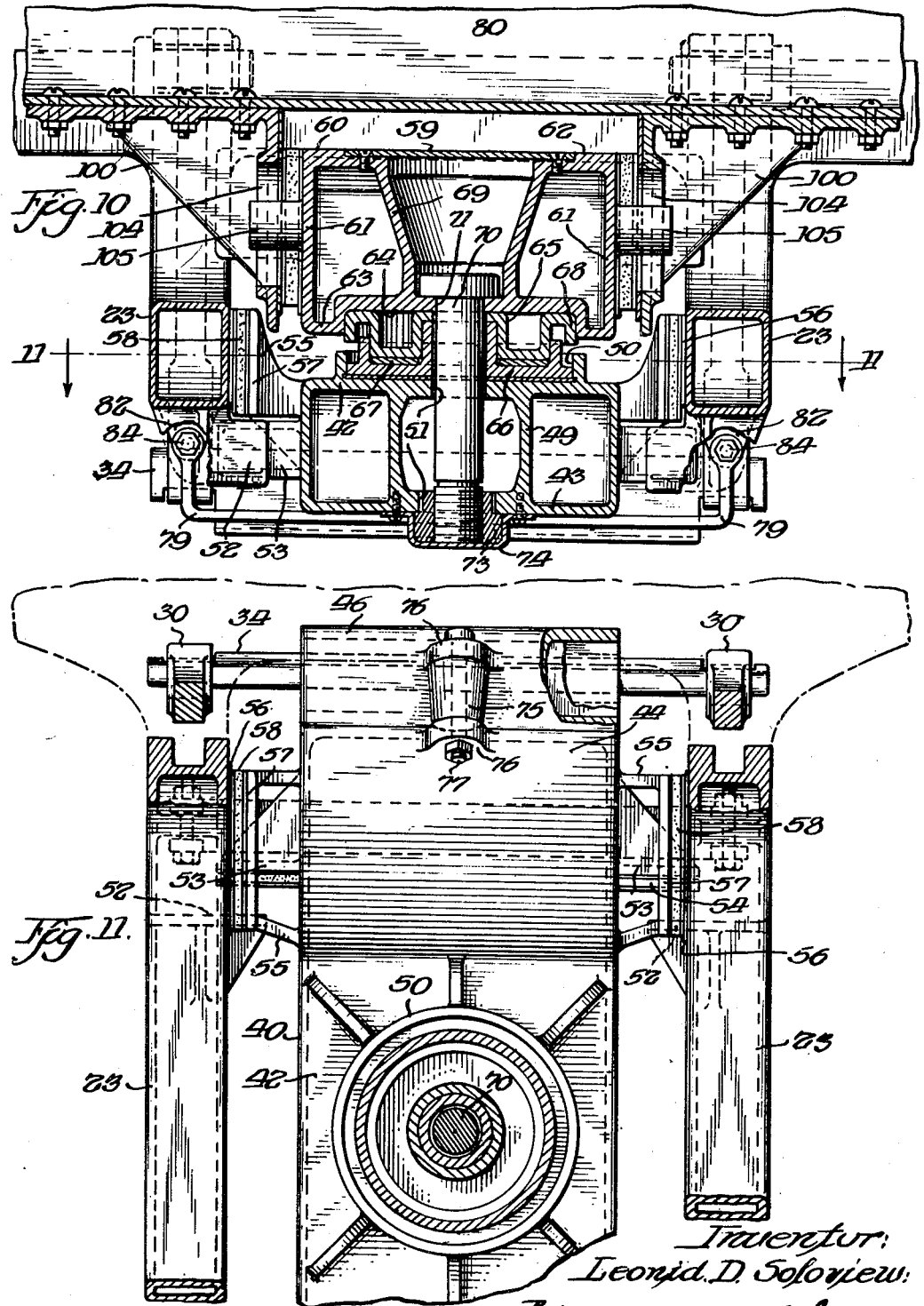

March 14, 1950 L. D. SOLOVIEW 2,500,906
RAILWAY CAR TRUCK

Filed Oct. 28, 1944 8 Sheets-Sheet 7

Inventor:
Leonid D. Soloview
By Oscar Hochberg
Atty.

March 14, 1950

L. D. SOLOVIEW 2,500,906

RAILWAY CAR TRUCK

Filed Oct. 28, 1944

8 Sheets-Sheet 8

Inventor:
Leonid D. Soloview.
By Oscar Hochberg.
Atty.

Patented Mar. 14, 1950

2,500,906

UNITED STATES PATENT OFFICE 2,500,906

RAILWAY CAR TRUCK

Leonid D. Soloview, Chicago, Ill.

Application October 28, 1944, Serial No. 560,733

18 Claims. (Cl. 105—190)

This invention relates to railway passenger train car trucks and has for its primary purpose the provision of an easy riding truck of increased stability.

The principal object of the invention is the provision of a railway car truck and body suspension which isolates the car body from the supporting truck more fully to prevent the transmission of truck vibrations to the body and to provide the smoothest possible riding qualities.

An important object of the invention lies in the provision of a railway car truck suspension for supporting a car body and having supporting springs so arranged as to give maximum lateral stability to the body.

The main object of the invention contemplates a railway car truck suspension for supporting a car body and having a bolster rigidly supported by the truck and movable with the car body with supporting springs disposed between the bolster and the car body.

A more specific object of the invention includes a railway car truck suspension having a bolster rigidly supported in the truck but capable of swiveling and laterally swinging movements with respect thereto and a car body resiliently supported on the bolster with connections therebetween for movement of the bolster with the car body.

A further object of the invention provides a railway car body resiliently supported upon a bolster movable with the body with vertically acting shock absorbers between the car body and the bolster.

Another object of the invention is to provide a railway car truck having a sub-bolster suspended by swing hangers for guided lateral movement between transom members and rigidly supporting a main bolster pivotally associated therewith which in turn is directly associated with a railway car body resiliently supported thereon by means of springs between the bolster and body and movable with the body as the truck swivels and shifts laterally as a result of deviations in the track. The main bolster is connected to the car body for swiveling and lateral movements therewith relative to the truck but the body is movable vertically relative to the bolster and this movement is cushioned by the supporting springs and controlled by vertically acting shock absorbers.

Figure 13:
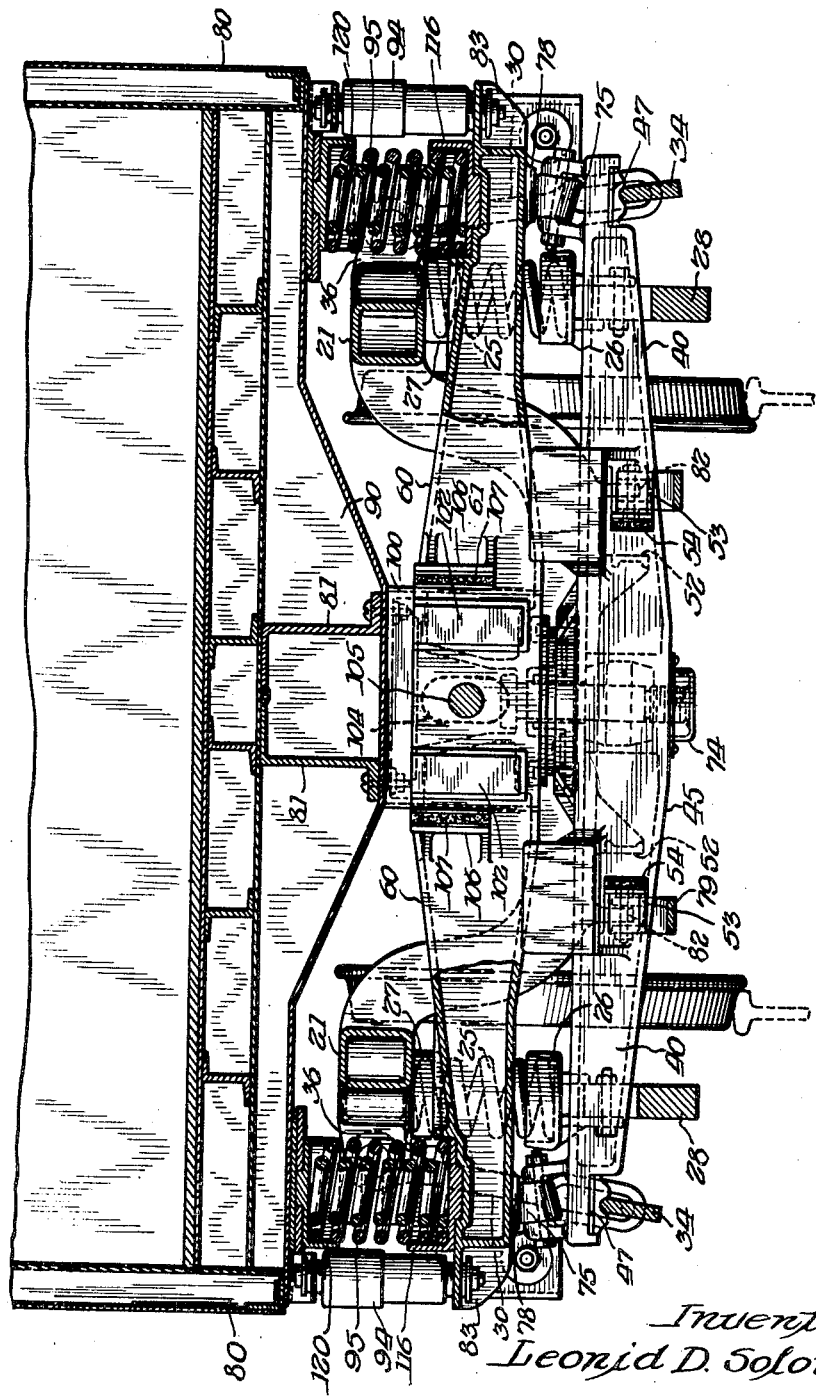

The foregoing and other objects of the invention are attained by the truck arrangement illustrated in the accompanying drawings in which Fig. 1 is a fragmentary plan view of a railway vehicle equipped with trucks corresponding with one form of this invention and having portions broken away to reveal the truck bolster for supporting the vehicle body and showing the relation of the bolster to the truck frame and body connections and the disposition of the supporting springs;

Fig. 2 is a vertical transverse sectional view through this same form of truck taken on the line 2—2 of Fig. 1 showing the sub-bolster suspended by swing hangers from the truck frame transoms with the main bolster supported on the sub-bolster in swiveling relation by means of a center plate and king pin connection and having a vehicle body resiliently supported upon the main bolster by means of coil springs disposed between the truck bolster and body bolster construction inboard of the truck side frame with shock absorbers between the body and truck bolsters outboard of the side frame and showing the vertical alignment of the body supporting springs with the stabilizing bearings between the bolsters and the supporting key on the swing hangers;

Fig. 3 is a detail perspective view of the main bolster member used in the truck described in the preceding figures and showing the projecting end portion for connection of the shock absorber outboard of the truck side frame and the spring seats for the body supporting springs inboard of the side frame together with the removable plate providing access to the king pin when assembled and one of the longitudinally projecting guide pins for interlocking with the body connection;

Fig. 4 is a detail perspective view of the sub-bolster with which the main bolster of Fig. 3 is adapted to be assembled and showing the center plate well on the upper surface together with one of the roller bearings disposed directly over the swing hanger connection for stabilizing the main bolster and also showing the cushioned chafing plates for guiding the lateral swing motions of the sub-bolster between the truck frame transoms and for transmitting longitudinal forces between the frame and bolster and illustrating one of the cushioned stops projecting from the side of the bolster for engagement with a complemental stop on the truck frame to limit lateral swinging movement of the bolster;

Fig. 5 is a side elevational view of a railway vehicle supported upon a truck in accordance with another form of the invention and showing the general arrangement of the truck with equalizers supported upon spaced journals, truck springs upon the equalizers, a truck frame resiliently supported by the springs, a sub-bolster suspended from the truck frame by swing hangers for lateral swinging movements between transoms, a main bolster supported on the sub-bolster for relative swiveling movements and springs on the main bolster outboard of the truck side frame for supporting the vehicle together with hydraulic shock absorbers between the bolster and vehicle for controlling the action of the springs and longitudinally disposed flexible connections between the main bolster and the vehicle for maintaining the bolster normal to the vertical longitudinal plane of the vehicle;

Fig. 6 is a general plan view of the truck shown in Fig. 5 and showing the main bolster extending beneath the truck side frames with the vehicle connections extending from the respective ends in the same direction and the relation of the outboard springs and shock absorbers and also showing the depending members adapted removably to be secured to the under surface of the vehicle at opposite sides of the main bolster and engageable therewith to cause the vehicle and bolster to move together laterally and to transmit longitudinal forces therebetween;

Fig. 7 is a general transverse sectional view through the truck taken on the line 7—7 of Fig. 6 and showing the sub-bolster and main bolster suspended from the truck frame by means of swing hangers at opposite sides and further showing the resilient vehicle suspension on the outboard springs carried by the main bolster and the general relation of the vehicle to the main bolster and of that bolster to the sub-bolster and the truck frame;

Fig. 8 also is a transverse sectional view taken on the line 8—8 of Fig. 5 through the king bolt connection between the main and sub-bolsters and showing the relative swiveling relation between the two bolsters and the relation of the swing hangers and the safety supports extending between the transoms beneath the sub-bolsters;

Fig. 9 is a longitudinal sectional view through the truck taken on the line 9—9 of Fig. 7 and showing the disposition of the sub-bolster between the transoms with the chafing plates engaging wear plates thereon and revealing the inter-engaging relation of the stops limiting lateral swing motion and the main bolster superposed on the sub-bolster and interlocked with the depending brackets on the vehicle;

Fig. 10 also is a longitudinal sectional view but taken through the center plate and king bolt connection on the line 10—10 of Fig. 8 and showing the inter-locking nature of the connection between the vehicle and the main bolster and the general relative position thereof to the truck frame and clearly showing the safety supports extending beneath the bolsters;

Fig. 11 is a sectional detail plan view taken on the line 11—11 of Fig. 8 showing the sub-bolster disposed between the transoms in a central position maintained by the chafing plates for lateral movement determined by the inter-engaging stops and showing the center plate and one of the bolster stabilizing roller bearings over the swing hanger key;

Fig. 12 is a disassembled general view of the various inter-engaging members of the truck spaced apart in their relative positions ready for assembly and showing the sub-bolster disposed beneath the truck frame with the swing hangers broken apart and the main bolster above the frame with one of the depending brackets on the vehicle in position above the bolster to be interengaged with the cushioned complemental surfaces on the bolster; and Fig. 13 is a cross sectional view of a suspension arrangement similar to that illustrated in Fig. 7 having outboard body supporting springs but differing therefrom in the disposition of the swing hangers outboard to provide support for the sub-bolster in vertical alignment with the stabilizing bearings between the main and sub-bolsters and with the body supporting springs carried by the main bolster, as in the inboard arrangement illustrated in Fig. 2. In this construction the main and sub-bolsters are substantially co-extensive in length and all of the suspension parts are disposed outboard of the truck frame together with the hydraulic shock absorbers.

Heretofore railway passenger train car trucks in their most generally accepted form have consisted of equalizer trucks having wheel and axle assemblies spaced apart by equalizer members supported thereby and a truck frame having pedestals engaging the axle assemblies and resiliently supported on the equalizers by means of springs interposed therebetween. This truck frame included intermediate transom members from which a spring plank was suspended by means of swing hangers for relative swing motion laterally of the truck and which resiliently supported a swing motion bolster by means of springs disposed between the spring plank and the bolster which was adapted to swing laterally with the spring plank between the transom members and guided by chafing plates between the bolster and transoms which also transmitted longitudinal forces therebetween. The bolster was provided with a center plate on its upper surface in which a vehicle body was supported by means of a complemental center plate for relative swiveling motion in respect to the truck.

The present invention provides a railway passenger train car truck which in the forms shown include a truck frame resiliently supported on equalizers by means of coil springs as heretofore but differing materially in the suspension of the bolster in the truck frame and in the suspension of the vehicle body on the bolster. The invention eliminates the conventional spring plank and provides a sub-bolster suspended directly from the truck frame by swing hangers for swing motion laterally of the truck guided between transom members by chafing plates or their equivalent adapted to transmit force due to draft and buffing. The invention also eliminates the usual springs for resiliently supporting the bolsters and mounts the main bolster directly on the sub-bolster for lateral swing motion therewith. The usual center plate connection between the vehicle body and the truck bolster is dispensed with and the center plates located between the main and sub-bolsters. The main bolster is connected to move with the vehicle body in swiveling relation to the sub-bolster and the body is resiliently supported on the truck by springs interposed directly between the vehicle and the main bolster. The action of these springs is controlled by shock absorbers disposed in parallel therewith. Connections permitting relative vertical deflection are provided between the vehicle and the main bolster for transmitting draft and buffing forces therebetween.

In the drawings 10 represents a railway car truck including wheel and axle assemblies 11 with journal boxes 12 mounted thereon and equalizers 13 supported on the boxes and maintaining the assemblies in spaced relation. The members 13 comprise what is known as drop equalizers and are of built-up construction consisting of a flat plate 14 cut to shape to provide the desired drop contour and secured by welding between top and bottom flange plates 15 and 16 to provide an I-shaped section affording the necessary strength while maintaining the weight at a minimum. The feet of the equalizers resting upon the journal boxes may be formed by upsetting the ends of the equalizers to provide solid portions 17 adapted to be slotted as at 18 to form keyways interlocking with keys 19 on the equalizer seats provided on the top of the respective journal boxes. A truck frame 20 comprising side frames 21 connected by end sills 22 and intermediate transoms 23 is provided with pedestals 24 engaging the respective journal boxes 12. The frame is resiliently supported from the equalizers 13 by means of coil springs 25 carried in spring seats 26 secured to the equalizers and engaged by spring caps 27 on the under surfaces of the side frames 21 and located adjacent to the journal positions.

The transoms 23 extend between the side frames 21 and together therewith form a rectangular opening intermediate the length of the truck. The transoms throughout the major portion of their extent between the side frames are disposed on a plane beneath the general level of the side frames. Swing hangers 30 are pivotally suspended from the upper portions of the transoms adjacent to the side frames of the truck. The hangers are disposed in openings 31 extending through the transoms and are pivoted on pins 32 entered through upstanding lugs 33 on the upper surface of the transoms and secured by cotter keys. These swing hangers are arranged one at each of the four corners of the rectangular opening formed by the transoms and side frames and each pair of hangers adjacent the respective sides of the truck is connected by a key 34 extending between the lower ends of the hangers and entered in openings 35 therein for swinging motions therewith laterally of the truck. The arrangement thus far described comprises the basic structure of a typical railway passenger train car truck adapted for incorporation of the suspension of the present invention.

A truck bolster 40 is supported by the swing hangers 30 and bridges the distance laterally of the truck between the keys 34 upon which it is directly supported and is of such length as to cause the hangers to assume outward inclinations with respect to their individual pivotal upper connections 32. This truck bolster is disposed in supporting relation beneath a main bolster hereinafter to be described and comprises with the swing hangers the primary supporting element for the swing motion suspension of the vehicle but in consideration of its lower position in the truck is referred to as a sub-bolster. The sub-bolsters in all forms of the invention disclosed are substantially identical—the only distinctions consisting essentially in a difference in height of the middle portion of the bolster above the rail and in relative lengths which are readily discernible from a comparison of Figs. 2, 8, and 13. The sub-bolster comprises an integral box shaped casting having vertical parallel side walls 41 connected by top and bottom walls having central horizontal portions 42 and 43 respectively and converging portions 44 and 45 which join with end portions 46 of reduced height at the position of the supporting keys 34. A recess 47 is provided in the under surface of the reduced end portion for the reception of a bearing seat 48 engaging the supporting key. The mid-portion of the sub-bolster is of substantial depth and is reinforced by a hollow wall structure 49. The central horizontal upper surface 42 of the bolster is provided with a center plate well 50 and is formed with a king pin opening 51 which also extends through the bottom wall 43 and is disposed within the area of the hollow enclosing wall 49.

The sub-bolster 40 is disposed within the opening in the truck frame formed by the side frames 21 and the connecting transoms 23 and is adapted to have swing motion laterally of the truck through the medium of the swing hanger suspension of the member. This swing motion is limited by means of stops 52 integral with and projecting from the transoms in the path of stops 53 on the sub-bolster. These latter stops are provided with resilient units 54 for cushioning final movements of the bolster and which may be of rubber or the like faced with metal plates and secured to the stops 53 in position to function as buffers between the stops 52 and 53. The stops 52 project into the bolster space from the under side of transoms 23 while the stops 53 project from the vertical side walls 41 of the sub-bolster in position to engage the former during swinging movements. The lateral swinging of the sub-bolster is guided between the transoms by means of chafing plates which also transmit longitudinal thrusts between the transoms and bolster arising as a result of draft and buffing forces or braking actions. The chafing plates are of a design whereby contact is maintained between opposing surfaces at all times and no provision is made for clearance therebetween whereby lost motion is prevented and sudden shocks resulting therefrom avoided. By the same arrangement an objectionable source of noise is eliminated. The sub-bolster 40, as best shown in Figs. 4 and 11, is provided with integral brackets 55 disposed at opposite sides of the bolster and adjacent to each end thereof in opposed relation to wear plates 56 secured to the transoms 23. Between the webs 57 of the bolster brackets and the wear plates on the transoms are disposed cushioning elements 58 secured to the brackets and comprising rubber pads sandwiched between metal plates. These surface plates on the cushioning elements are disposed one of them on each unit in engagement with the web 57 of the respective brackets 55 and the other slidingly engaging the transom wear plate 56 as the bolster has lateral swinging motion.

A main bolster 60 is carried directly by the sub-bolster for lateral swinging motions therewith and has relative swiveling movement with respect thereto. The main bolster, as shown, also is an integral hollow casting like the sub-bolster 40 and having vertical parallel side walls 61 and top and bottom walls 62 and 63 forming a box section. The bottom wall is recessed as at 64 for reception of a male center plate 65 which supports the main bolster on the sub-bolster and in so doing is engaged with a female center plate 66 mounted within the center plate well 50 on the upper surface of the sub-bolster whereby to provide a swiveling connection between the two bolster members. A bearing plate 67 is disposed between the operative surfaces of the two center plates and a depending annular flange 68 on the upper plate protects the bearings from the entrance of forcign materials in service. A king bolt 70 passing centrally through the center plate connection positively connects the two bolster members against separation. The main bolster 60 is provided with an annular wall structure 69 extending between the upper wall 62 and the recess 64 in the bottom wall and which provides a hollow space open at the top for entrance of the king pin. The head of the locking member 70 is seated upon the recessed wall 64 with the shank of the bolt passing through an opening 71 therein. The shank extends downwardly through the inter-engaging center plates and entirely through the sub-bolster 40, passing through openings 51 in the top and bottom walls 42 and 43 thereof within the area of the hollow enclosing wall 49 with the threaded lower end extending beyond the lower surface for application of a hexagonal nut 73 which is provided with a portion entering the opening 51 in the lower wall 43 and is securely held in place by a locking cap 74 closely engaging the nut and removably secured to the bottom wall of the sub-bolster. A cover plate 59 is removably secured to the top wall 62 of the bolster over the hollow space 69 to exclude dirt and foreign materials from getting into the connection at this point.

The main bolster 60 is disposed transversely of the truck and the end portions thereof extend beneath the truck side frames 21 as best shown in Figs. 7 and 13. The bolster swivels relatively to the sub-bolster in the center plate 66 within the confines of the truck frame opening defined by the side frames 21 and spaced connecting transoms 23. The width of the main bolster and the space between the transoms are so related that the pivotal movement of the bolster may be such as to accommodate any curve normally encountered by cars operating on main line track and capable also of negotiating the relatively sharper curves found in yards. Similarly where the bolster passes beneath the side frames ample clearance is provided to prevent contact of the bolster with the lower side of the frame as a result of spring deflection or rebound or due to the swinging movements of the bolsters. Means are provided for stabilizing the main bolster in the form of roller bearings 75 operative between the main bolster and sub-bolster and located at opposite ends of the latter. The rollers 75 are rotatably mounted in upstanding lugs 76 on the upper surface of the reduced end portions 46 of the sub-bolster by means of removable pins or axles 77, whereby the rollers may be renewed, and engage bearing surfaces 78 on the under side of the main bolster. It will be seen that the bearings are spaced apart laterally the maximum distance permissible whereby to lend utmost stability to the main bolster and are disposed directly over the seats 48 supporting the sub-bolster from the keys 34 suspended between the swing hangers 30. The roller bearings maintain a fixed stability of the main bolster while permitting swiveling motion thereof relative to the sub-bolster. Safety supporting straps 79 are disposed beneath the bolster assembly at opposite sides of the truck and extending between and carried by the transom members 23. The safety straps are suspended from the transoms by means of depending lugs 82 on the under surface of the respective transoms to which the straps are secured by means of bolts 84 in position to bridge the opening between the transoms beneath the bolsters.

It is to be noted that the only resilient suspension in the truck thus far described comprises the basic spring support of the truck frame from the equalizers resting on the journal boxes and that the main bolster is rigidly supported on the sub-bolster and moves as a unit therewith in all motions relative to the truck frame except swiveling motions wherein the main bolster swivels relatively to the supporting sub-bolster and to the truck frame and by limiting lateral swinging movements of the sub-bolster such movements of the main bolster likewise are limited. However a vehicle 80 is adapted to be supported on the main bolster 60 and means are provided whereby resilience is had between the vehicle body and the main bolster thereby more effectively to prevent the transmission of truck noises and shock to the body. In the form of the invention best revealed in Figs. 1 and 2 the connection between the vehicle body and the main bolster is shown as involving supporting springs located inboard of the truck side frames 21.

In this construction the bolster 60 is disposed in its main extent between the side frames 21 in the opening formed by the transoms 23 and is provided with portions extending beneath and beyond the side frames for association with shock absorbers connecting the bolster with the vehicle body. The top wall 62 of the bolster extends horizontally between raised spring seat supporting portions 85 which represent the maximum extent of the main load supporting portion of the bolster laterally of the truck between the side frames 21 and the bottom wall 63 at opposite sides of the central recess for the center plate assembly, slopes upwardly to the ends of this main portion of the bolster. Ample clearance is provided between these ends of the bolster and the inner surfaces of the side frames to allow full lateral swinging of the bolster within the limits permitted by the stops 52 and 53. This clearance is obtained by offsetting the side frames 21 outwardly between the transoms 23. Beneath the respective spring seat portions 85 the bolster is provided with downwardly extending portions 86 which support the bearing surfaces 78 engaging the roller stabilizing bearings 75 on the sub-bolster. Thus it will be seen that the vehicle supporting springs are disposed directly over the stabilizing bearings 75 which in turn are located directly over the support 34.

Mounted upon the elevated end portions 85 of the bolster 60, which might be termed spring platforms, are spring seats 87, which, as shown, are disposed in pairs arranged side by side in a direction longitudinally of the truck and removably held in place by means of interlocking lugs 88 extending upwardly from the surface of the spring platform 85 and integral with the bolster. The spring seats 87 provide upwardly opening pockets adapted to receive coil spring groups 95 and are flanged at their upper edges and these flanges support non-metallic material 89 which is adapted to cushion and deaden the sound of contact by the spring seats with the under surface of the underframe 90 of the vehicle 80. The spring seats thus limit deflection of the springs 95 and are shaped to correspond with the contour of the under side of the underframe whereby the upstanding portions of the seats are disposed at a higher level at the outer side than at the side inwardly of the truck thereby conforming to the slope of the underframe bottom surface. The spring groups 95 are nested in spring pockets 91 extending the depth of and recessed within the underframe 90. The pockets 91 are flanged about their lower extremities at the under side of the underframe as at 92 and it is with this flange that the non-metallic element 89 engages to limit deflection of the springs 95. The supporting springs are free normally to suspend the vehicle body resiliently upon the bolster 60 but excessive compression of the springs is prevented by engagement of the opposed flanges on the spring pockets and seats.

From the depending bearing supports 86 of the main bolster, outwardly directed integral portions 93 extend beneath the side frames 21 for connection of vertically acting hydraulic shock absorbers 94 disposed between the bolster 60 and the vehicle body in parallel with the springs 95. The shock absorbers are disposed one at each side of the truck outboard with respect to the truck side frame whereas the supporting springs are disposed inboard and serve to modify the action of the springs to control the rebound and smooth out their operation. Each shock absorber includes relatively movable arts telescopically engaged and secured respectively to the underframe 90 and the member 93. The underframe is provided with depending brackets 96 rigidly secured thereto and to which the shock absorber is adapted to be removably secured. The member 93 is provided with an opening 97 for attaching the shock absorber and bracket 96 is similarly equipped. Attaching bolts at opposite ends of the absorber are entered through the respective openings with flexible units 98 disposed at opposite sides of the web of the bracket 96 and of the member 93 and secured by nuts 99 threaded onto the bolts and seating against retaining washers bearing on the outermost flexible units. By the flexible connections described the shock absorbers are permitted sufficient angularities with respect to the bolster 60 and the vehicle 80 to compensate for any variations in the angular relation between the bolster and the vehicle due to the deflection of one or the other or both of the spring groups 95 at opposite sides of the truck.

The springs 95 comprise the only supporting connection between the vehicle body and the bolster 60 and it will be seen that the body, when considering its disposition upon two supporting tracks—one at each end, is resiliently suspended at four points in what might be termed floating relation to the trucks and controlled by the hydraulic action of the shock absorbers paralleling the spring groups. With this suspension it is necessary that the main bolster 60 at all times be maintained normal to a plane extending longitudinally of the body while the truck swivels freely in relation thereto so that in effect the bolster 60 becomes a body bolster in fixed relation to the vehicle but resiliently connected thereto and directly engaging the truck center plate connection to provide the necessary swiveling relation between body and truck. To transmit longitudinal draft and buffing forces between the body and the bolster and to maintain a fixed relation of the bolster to the body against relative lateral displacement whereby to prevent distortion or canting of the supporting springs while permitting relative vertical movement of the body with respect to the bolster, means are provided on the body for engaging the bolster to accomplish these functions without in any way affecting the operation of the springs 95 or the shock absorbers 94.

These means comprise castings 100 removably secured to the underside of center sill 81 at opposite sides of the bolster by means of bolts 101 whereby to transmit draft and buffing forces directly therebetween. The castings extend downwardly from their attachment to the center sill at each side of the bolster to contact the bolster throughout its full height and slidingly engage the sides of the bolster as the vehicle body has relative vertical movement with respect to the bolster when the springs 95 are deflected under load. As best shown in Fig. 1 the engagement of the members 100 with the bolster is cushioned by means of resilient units 102 which comprise pads of rubber faced with metal plates interposed between the opposed faces of the abutting members. The metal faced rubber units are secured to the members 100 and are disposed frictionally to engage wear plates 103 on the bolster during relative vertical sliding movements of the associated parts. The rubber pads cushion all forces between the bolster 60 and vehicle body and maintain engagement at both sides of the bolster with the respective members 100 throughout the full vertical extent of the bolster whereby to prevent tilting of the bolster from longitudinally applied forces.

The members 100 in addition to transmitting buff and draft forces between the body and bolster serve further to guide the vertical reciprocations of the bolster with respect to the vehicle body and act also to maintain a fixed relation of the bolster with respect to the body against relative lateral displacement whereby to assure the equilibrium of the supporting springs 95 laterally as well as longitudinally. The bolster 60 is provided at each side with a pair of spaced brackets 106 projecting outwardly from the respective side walls 61 at opposite sides of the members 100 in position to oppose relative lateral movements between the bolster and such members as best shown in Figs. 2 and 3. The brackets are designed to prevent all relative lateral movements between the parts but are adapted to permit relative angling movements therebetween resulting from deflection of the body supporting springs 95 on one side more than on the other in the operation of the vehicle. This twofold function is accomplished by the interposition of resilient units 107 comprising metal faced rubber pads between the opposing surfaces of the respective brackets 106 and the members 100. These cushioning units are secured to the brackets and have vertical sliding engagement with the side walls of members 100 during relative vertical movement and are adapted to maintain contact between the parts at all times to prevent lateral displacement.

Thus it will be observed that relative lateral movement between the bolster 60 and the members 100 is positively prevented by the close interengagement of these parts while free relative movement vertically is readily permitted by the sliding engagement of the members with the bolster whereby the bolster is maintained in fixed relation to the vehicle while having relative vertical movement with respect thereto. A safety interlock arrangement is provided between the bolster 60 and the vehicle body 80 and since the bolster is interlocked with the truck by reason of its disposition beneath the truck side frames 21 it will be seen that separation of the body and truck is prevented by interlocking the body and bolster. The bolster is interlocked with the body in such manner that the body cannot be separated from the truck without first removing the members 100. The interlocking arrangement includes lugs 105 projecting from the opposite side walls 61 of the bolster and entered within complemental vertical slots 104 in the respectively facing walls of the members 100 and disposed between the cushioning elements 102. This interlocking relation of the parts is best shown in Fig. 10 from an examination of which it will readily be seen that while the slot 104 affords sufficient clearance about the lug 105 to permit all necessary relative movement, separation is positively prevented without first removing the members 100. The lug 105 as shown is constructed integrally with the bolster but if desired may be a separately formed member and attached in any manner preferred.

As best shown in Figs. 5 and 6 which comprise general views of the entire truck, flexible connections 111 are disposed between the end portions of the bolster 60 extending beyond the side frames 21 and the vehicle body 80 and which function to maintain the bolster in absolute square with the vehicle underframe while permitting the relative vertical movement between body and bolster necessary to the absorption of shock by the springs 95. The connections 111 are disposed one at each side of the truck between the opposite ends of the bolster and the vehicle and both extending in the same direction to one side of the bolster and comprise strut members adapted to prevent movement of the bolster longitudinally of the vehicle in either direction or rotating movements thereof relative to the vehicle. Integral brackets 112 are incorporated in the end portions of the bolster extending beyond the respective side frames for the attachment of the flexible connections and disposed to one side of the bolster in spaced relation to brackets 113 supported from the underframe 90 of the vehicle. The brackets 113, as shown in Fig. 5, are suspended from the vehicle by means of intermediate brackets 114 rigidly secured to the underframe 90 and to which the brackets 113 are riveted, as shown. The connections 111 extend between and are secured to the brackets 112 and 113 to provide positive anchorages for the bolster. The connections act as struts between the brackets but the interposition of rubber pads 115 at opposite sides of the respective brackets 112 and 113 where the connections 111 are secured provide sufficient flexibility to allow for angling of the struts with respect to the brackets as the relative position of the vehicle 80 varies with respect to the bolster 60 as the body supporting springs are deflected in operation. In the form shown the struts 111 each comprise a hollow tube portion having flat washers welded to the opposite ends and disposed between the brackets 112 and 113 with an elongated rod or bolt extending entirely therethrough and passing through the rubber units 115 at opposite sides of the respective brackets with metal washers at the outside of the respectively outermost rubber members and the whole secured by nuts threaded on opposite ends of the elongated rod whereby to maintain the entire assembly under initial compression. By the use of the flexible connections described the main bolster 60 is at all times maintained normal to a plane longitudinally of the vehicle while permitting all necessary relative vertical movement between the vehicle body and bolster.

In that form of the invention best illustrated in Fig. 7 the main bolster 60 is shown as having its main structure extending beneath and beyond the respectively opposite side frames 21 of the truck with the body supporting spring groups disposed outboard thereof together with the shock absorbers 94 which are disposed between the respective ends of the bolster and the underframe 90 of the vehicle and flexibly secured in exactly the same manner as in the form previously described. The body supporting spring groups 95 are located between the shock absorbers and the side frames. Even though the body supporting springs 95 and the shock absorbers 94 controlling them are disposed outboard of the truck frame between the vehicle and the relatively extended main structure of the bolster the swing hangers 30 supporting the sub-bolster 40 are maintained inboard together with the stabilizing roller bearing 75 on the sub-bolster and the cooperating bearing surface 78 which is disposed directly on the bottom wall 63 of the main bolster. The sub-bolster 40 occupies the same relative position as in the other form of the invention extending only in the area between the plane of side frames 21 and supports the main bolster for lateral swing motion and in swiveling relation thereto by means of center plates 66 and 68. The swing motion is limited by the stops 52 and 53 and guided by chafing plates 58 exactly as in the other form. The main bolster 60 is guided in its movements relative to the vehicle as in the inboard spring arrangement by means of depending members 100 on the vehicle engaging the bolster through the medium of the resilient units 102 and 107 and brackets 106. The bolster 60 in this form is of box section construction continuously between and extending beneath the spring groups 95 to provide the strength necessary to the transmission of stresses imposed and terminates at opposite ends in brackets 83 affording mounting means for the hydraulic shock absorbers 94 for controlling the action of the springs. The spring groups are mounted in spring seats 116 which interlock with the bolster as at 117 and are provided with upstanding walls forming pockets for the springs. At the ends of the spring seats disposed longitudinally of the truck these upstanding walls are provided with horizontally disposed flanges 118 which are provided on their upper surface with non-metallic pads 119 which may be of rubber. Spring caps 120 are disposed on top of the spring groups and are interlocked with the vehicle underframe 80 as at 121 whereby the springs are held top and bottom against displacement. The spring caps 120 are formed with depending walls embracing the springs and at the longitudinal ends of the caps these walls are provided with horizontal flanges 122 complemental to and cooperating with the flanges 118 to limit the deflection of springs 95. The rubber pads 119 cushion the contact between the opposing flanges. Outwardly projecting bifurcated jaws 123 are also provided both on the spring seats 116 and on the caps 120 for the application of removable bolts (not shown) to compress the spring groups when it is desired to remove or exchange springs in regular service maintenance operations, at which time the vehicle body 80 is supported on jacks.

Longitudinal draft and buffing forces are transmitted between the vehicle body 80 and bolster 60 in the same manner as in the previously described form of the invention through the engagement of the members 100 with the bolster and the lateral positioning of the bolster with respect to the body likewise is maintained similarly to the previously described arrangement through the interlocking relation of the bolster to the members 100 and the flexible connections 111 maintain the normal relation of the bolster at right angles to the longitudinal direction of the underframe. The safety interlock involving the projecting studs 105 entered within openings 104 in the members 100 also is provided in this form of the invention just as in that previously referred to. In all respects, the constructions as represented in the two forms of the invention described are alike, differing only in the disposition of the body supporting spring groups either inboard of the truck side frames or outboard as the case may be and while in the outboard spring arrangement shown in Fig 7, the swing hangers 30, supporting key 34 and stabilizing bearings 75 are disposed inboard of the truck frame, this entire group of associated parts may be disposed outboard of the side frames to provide a suspension in which the supporting springs 95, stabilizing bearings 75 and keys 34 supported from the swing hangers 30 are arranged in vertical alignment as in the inboard arrangement illustrated in Fig. 2. In Fig. 13 an arrangement is illustrated in which the swing hangers 30 are pivotally suspended from laterally projecting jaws 36 disposed on the outboard face of the truck side frames 21. In this arrangement the equalizer springs 25 in seats 26 have been maintained at their normal height but the level of the forged equalizers 28 has been lowered therebetween to provide clearance for the sub-bolster 40 which has been extended beyond the plane of the truck side frames and substantially coextensive with the main bolster 60 for support outboard on the swing hanger keys 34 suspended between the respective pairs of swing hangers at opposite sides of the truck. The support 34 in this arrangement, like in Fig. 7, is disposed directly beneath the stabilizing bearing 75 at each side of the truck but, like the arrangment illustrated in Fig. 2, the support 34, stabilizing bearings 75—78 and the body supporting springs 95 are all disposed in vertical alignment. All of the suspension parts in this arrangement are disposed outboard as distinguished from the complete inboard arrangement of these parts in Fig. 2 and the disposition of certain of the parts inboard and other parts outboard as in Fig. 7. Both the construction shown in Fig. 7 and that shown in Fig. 13 provide the widest possible base for the springs 95 and all of the arrangements isolate the vehicle 80 more fully from the truck and prevent transmission of vibration and shock or sound from the truck to the body than has heretofore been possible.

The prime feature of this invention is the disposition of the supporting springs between the vehicle body and bolster members supporting the body directly on trucks having swiveling relation thereto and from the foregoing description it will be seen that a vehicle suspension arrangement has been provided wherein a bolster member resiliently mounted with respect to the vehicle is supported directly on a truck bolster for lateral swing motion therewith and relative swiveling movements thereto with the truck bolster suspended directly on swing hangers without interposition of the usual cushioning springs. The suspension provides a bolster movable with a vehicle body having springs between the body and bolster for cushioned relative vertical movement guided between rigid means provided on the vehicle, with separate connections between the bolster and vehicle maintaining the normal relationship of the bolster in square with the body and having shock absorbers in parallel with the springs for controlling their action and the body supported on a truck by means of a swiveling connection between the bolster and the truck. The arrangement utilizes springs between the body and bolster disposed either inboard or outboard with respect to the truck frame and which when disposed in either relation may be used in combination with a truck bolster supported for swing motion by hangers disposed either inboard or outboard. In either arrangement stabilizing bearings are provided between the truck bolster and the main bolster and which may be disposed in vertical alignment with the body supporting springs and the swing hanger support or offset in respect thereto depending upon the use of inboard or outboard swing hangers.

What is claimed is:

1. In a vehicle, a truck having a frame structure including spaced apart side frame members connected by spaced transom members forming a bolster opening and resiliently supported on wheels and axles, a sub-bolster in the bolster opening suspended directly from the truck frame for lateral motion relative to the frame by means of swing hangers, a bolster supported on the sub-bolster for relative swiveling movement and disposed below the uppermost level of said frame members, a vehicle body suspended on the bolster, supporting springs between the bolster and said body, and shock absorbers connected between the bolster and body controlling the action of the supporting springs, said springs and said absorbers being disposed at opposite sides of the respective truck side frames.

2. In a vehicle, a truck having a frame structure including spaced apart side frame members connected by spaced transom members forming a bolster opening and resiliently supported on wheels and axles, a sub-bolster in the bolster opening suspended directly from the truck frame for lateral motion relative to the frame by means of swing hangers, a bolster supported on the sub-bolster for relative swiveling movement and disposed below the uppermost level of said frame members, a vehicle body suspended on the bolster, supporting springs between the bolster and said body disposed inboard of said side frames, and shock absorbers connected between the bolster and body outboard of said side frames controlling the action of said springs.

3. In a vehicle, a truck having a frame structure including spaced apart side frame members connected by spaced transom members forming a bolster opening and resiliently supported on wheels and axles, a sub-bolster in the bolster opening suspended directly from the truck frame for lateral motion relative to the frame by means of swing hangers, a bolster supported on the sub-bolster for relative swiveling movement and disposed below the uppermost level of said frame members, a vehicle body suspended on the bolster, and supporting springs between the bolster and said body disposed outboard of said side frames.

4. In a vehicle, a truck having a frame structure including spaced apart side frames connected by spaced transom members forming a bolster opening and resiliently supported on wheels and axles, a sub-bolster structure suspended from the truck frame for lateral motion relative to the frame by means of swinging supports including swing hangers disposed outboard of said side frames, a bolster supported on the sub-bolster for relative swiveling movement, stabilizing bearings between the sub-bolster and said bolster, a vehicle body suspended on the bolster, and supporting springs between the bolster and said body disposed outboard of said side frames, said supports and said bearings and said supporting springs being disposed substantially in vertical alignment.

5. In a vehicle, a truck having a frame structure including spaced apart side frame members connected by spaced transom members forming a bolster opening and resiliently supported on wheels and axles, a sub-bolster in the bolster opening suspended directly from the truck frame for lateral motion relative to the frame by means of swinging supports including swing hangers disposed inboard of said side frames, a bolster supported on the sub-bolster for relative swiveling movement and disposed below the uppermost level of said frame members, stabilizing bearings between the bolster and said sub-bolster disposed substantially in vertical alignment with said supports, a vehicle body suspended on said bolster, and supporting springs between the bolster and said body disposed outboard of said side frames.

6. In a vehicle, a truck having a frame structure including spaced apart side frame members connected by spaced transom members forming a bolster opening and resiliently supported on wheels and axles, a sub-bolster in the bolster opening suspended directly from the truck frame for lateral motion relative to the frame by means of swing hangers, a bolster supported on the sub-bolster for relative swiveling movement and disposed below the uppermost level of said frame members, a vehicle body suspended on the bolster, supporting springs between the bolster and said body disposed outboard of said side frames, and shock absorbers connected between the bolster and body controlling the action of said springs.

7. In a vehicle suspension including a body and a supporting truck disposed in swiveling relation, a truck frame including spaced apart side frames supported on wheel and axle assemblies, a truck bolster, swing hangers suspending the bolster directly from said frame, a bolster supported on the truck bolster in swiveling relation thereto disposed below the uppermost level of said frame and movable with said body, a load supporting center plate connection between said bolsters, resilient supporting means between said second-named bolster and the body disposed outwardly of said side frames, interengaging means on the body and said second-named bolster including means for transmitting draft forces therebetween and means for restraining relative lateral movement independently of said resilient means, and means interlocking said second-named bolster with the body against separation.

8. In a vehicle suspension including a body and a supporting truck disposed in swiveling relation, a truck frame including side frames supported on wheel and axle assemblies, a truck bolster, swing hangers suspending the bolster from said frame and having pivotal connection with the bolster outwardly of the respective side frames, a bolster supported on the truck bolster in swiveling relation thereto and movable with said body, a load supporting center plate connection between said bolsters, resilient supporting means between said second-named bolster and the body disposed outwardly of said side frames, and interengaging means on the body and said second-named bolster including means for transmitting draft forces therebetween and means for restraining relative lateral movement independently of said resilient means, said resilient means being disposed respectively in substantially vertical alignment with said pivotal connections at opposite sides of the truck.

9. In a vehicle suspension including a body and a supporting truck disposed in swiveling relation, a truck frame including side frames supported on wheel and axle assemblies, a truck bolster, swing hangers suspending the bolster from said frame and having pivotal connection with the bolster outwardly of the respective side frames, a bolster supported on the truck bolster in swiveling relation thereto and movable with said body, stabilizing bearings between the truck bolster and said second-named bolster, and resilient supporting means between said second-named bolster and the body, said respective pivotal connections of the swing hangers and said bearings and said resilient means being disposed substantially in vertical alignment at opposite sides of the truck.

10. In a vehicle suspension including a body and a supporting truck disposed in swiveling relation, a truck frame including side frames supported on wheels and axles, a truck bolster, swing hangers suspending the bolster directly from said frame and having pivotal connection with the bolster outwardly of the respective side frames, a bolster supported on the truck bolster in swiveling relation thereto disposed below the uppermost level of said frame and movable with said body, a load supporting center plate connection between said bolsters, resilient supporting means between said second-named bolster and the body, and interengaging means on the body and said second-named bolster including means adapted to transmit draft forces therebetween, restrain relative lateral movement therebetween and prevent relative swiveling movement therebetween all independently of said resilient means.

11. In a vehicle suspension including a truck frame resiliently supported on wheels and axles, a sub-bolster suspended by swing hangers directly from the frame for lateral swing motion, a bolster supported on the sub-bolster for relative swiveling movement and disposed below the uppermost level of said frame, a vehicle body suspended on said bolster, resilient means in supporting relation between said bolster and vehicle body and interengaging means on the vehicle body and bolster for guiding the bolster during relative vertical movement and restraining relative lateral movement, said means locking the bolster with the vehicle body against separation.

12. In a vehicle, a truck frame supported on wheels and axles, a sub-bolster suspended by swing hangers directly from the frame for lateral swing motion, a bolster supported on the sub-bolster for relative swiveling movement and disposed below the uppermost level of said frame, a vehicle body suspended on said bolster, resilient means in supporting relation between the bolster and said body, a shock absorber connected between the bolster and body controlling the action of said resilient means, and interengaging means on the vehicle body and bolster for guiding the bolster during relative vertical movement and restraining relative lateral movement, said means locking the bolster with the vehicle body against separation.

13. In a vehicle, a truck including a frame resiliently supported on wheels and axles, a sub-bolster suspended by swing hangers directly from the frame for lateral swing motion, a bolster supported on the sub-bolster for relative swiveling movement and disposed below the uppermost level of said frame, a vehicle body suspended on said bolster, interengaging means on the vehicle body and bolster for guiding the bolster for relative vertical movement and restraining relative lateral movement, means locking the bolster and sub-bolster against separation, and means interlocking the bolster with said vehicle.

14. In a vehicle, a truck having a frame structure including spaced apart side frame members connected by spaced transom members and resiliently supported on wheels and axles, a sub-bolster suspended directly from the truck frame for lateral motion relative to the frame by means of swing hangers, a bolster supported on the sub-bolster for relative swiveling movement and disposed below the uppermost level of said frame members, a vehicle body suspended on the bolster, and supporting springs between the bolster and said body disposed outboard of said side frames.

15. In a vehicle, a truck having a frame structure including spaced apart side frames connected by spaced transom members and resiliently supported on wheels and axles, a sub-bolster structure suspended from the truck frame for lateral motion relative to the frame by means of swinging supports including swing hangers disposed outboard of said side frames, a bolster supported on the sub-bolster for relative swiveling movement, stabilizing bearings between the sub-bolster and said bolster, a vehicle body suspended on the bolster, and supporting springs between the bolster and said body disposed outboard of said side frames.

16. In a vehicle, a truck having a frame structure including spaced apart side frame members connected by spaced transom members and resiliently supported on wheels and axles, a sub-bolster suspended directly from the truck frame for lateral motion relative to the frame by means of swing hangers, a bolster supported on the sub-bolster for relative swiveling movement and disposed below the uppermost level of side frame members, a vehicle body suspended on the bolster, supporting springs between the bolster and said body disposed outboard of said side frames, and shock absorbers connected between the bolster and body controlling the action of said springs.

17. In a vehicle suspension including a body and a supporting truck disposed in swiveling relation, a truck frame including spaced apart side frames supported on wheel and axle assemblies, a truck bolster, swing hangers suspending the bolster directly from said frame, a bolster supported on the truck bolster in swiveling relation thereto disposed below the uppermost level of said frame and movable with said body, a load supporting center plate connection between said bolsters, resilient supporting means between said second-named bolster and the body, interengaging means on the body and said second-named bolster including means for transmitting draft forces therebetween and means for restraining relative lateral movement independently of said resilient means, and means interlocking said second-named bolster with the body against separation.

18. In a vehicle suspension including a body and a supporting truck disposed in swiveling relation, a truck frame including side frames supported on wheel and axle assemblies, a truck bolster, swing hangers suspending the bolster from said frame and having pivotal connection with the bolster outwardly of the respective side frames, a bolster supported on the truck bolster in swiveling relation thereto and movable with said body, a load supporting center plate connection between said bolsters, resilient supporting means between said second-named bolster and the body, and interengaging means on the body and said second-named bolster including means for transmitting draft forces therebetween and means for restraining relative lateral movement independently of said resilient means.

LEONID D. SOLOVIEW.

REFERENCES CITED

The following references are of record in the file of this patent:

UNITED STATES PATENTS

| Number | Name | Date |
|---|---|---|
| 132,643 | Driggs | Oct. 29, 1872 |
| 674,224 | Taylor | May 14, 1901 |
| 887,362 | Warfield | May 12, 1908 |
| 1,423,238 | Masury et al. | July 18, 1922 |
| 1,474,732 | Post | Nov. 20, 1923 |
| 1,522,192 | Masury et al. | Jan. 6, 1925 |
| 2,161,685 | Schoepf et al. | June 6, 1939 |
| 2,168,578 | Perkins | Aug. 8, 1939 |
| 2,245,585 | Hickman | June 17, 1941 |
| 2,268,267 | Sheesley | Dec. 30, 1941 |

FOREIGN PATENTS

| Number | Country | Date |
|---|---|---|
| 450,451 | Great Britain | July 9, 1936 |

Certificate of Correction

Patent No. 2,500,906

March 14, 1950

LEONID D. SOLOVIEW

It is hereby certified that errors appear in the printed specification of the above numbered patent requiring correction as follows:

Column 5, line 36, for "upstandting" read *upstanding*; column 9, line 22, for the word "arts" read *parts*; line 49, for "tracks" read *trucks*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*